DANIEL A. DENISON, OF TROY, MICHIGAN.

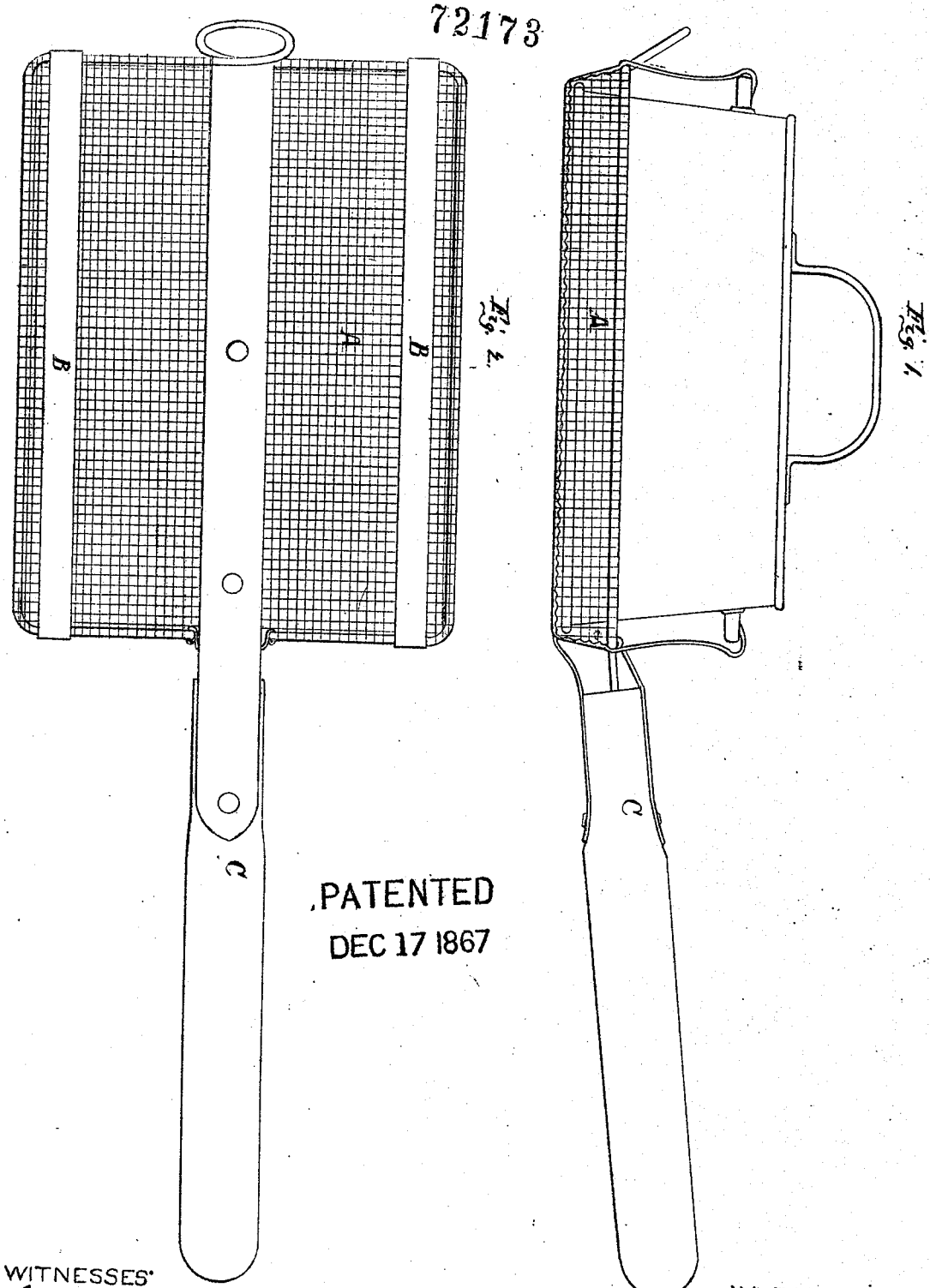

Letters Patent No. 72,173, dated December 17, 1867.

CORN-POPPER.

The Schedule referred to in these Letters Patent and making part of the same.

TO WHOM IT MAY CONCERN:

Be it known that I, DANIEL A. DENISON, of Troy, in the county of Oakland, in the State of Michigan, have invented a new and useful Improvement in Implements to be used for Roasting Coffee and Popping Corn; and I do declare that the following is an accurate description thereof, reference being had to the accompanying drawings, and the letters of reference marked thereon, being a part of this specification.

In constructing my invention, I make from wire cloth, of a suitable-sized mesh, the holder or pan A. To the bottom of this pan A, I attach two or more thin pieces of strap-iron, B B. I also attach to one end of this pan A, a suitable handle, C. To the wire-cloth pan above described I attach, by hinges or other suitable device, a tin pan or cover, D, made of the size required to fit into the pan A, for the purpose of confining the heat, and of preventing the contents of the pan A from being thrown out.

This invention is designed to be used upon the top of a stove or range, and the pieces of strap-iron B B will prevent the bottom of the wire pan A from coming into contact with the top of the stove or range.

This invention will be found of great value as a coffee-roaster and corn-popper, as, with proper attention, it obviates the danger of burning.

What I claim as my invention, and desire to secure by Letters Patent, is—

The arrangement and combination of the wire-cloth pan A with the pieces of strap-iron B B and the tin pan or cover D, all arranged substantially as described, for the purpose designed.

DANIEL A. DENISON.

Witnesses:
S. W. WALKER,
GEO. RUHLANDT.